Aug. 11, 1970  H. R. CHOPE  3,524,183
RESONANT CIRCUIT ENCODER

Filed Dec. 21, 1964  2 Sheets-Sheet 1

Inventor
Henry R. Chope
by G. Henry Peterson
AGENT

INVENTOR
HENRY R. CHOPE

United States Patent Office 3,524,183
Patented Aug. 11, 1970

3,524,183
RESONANT CIRCUIT ENCODER
Henry R. Chope, Columbus, Ohio, assignor to The Industrial Nucleonics Corporation, a corporation of Ohio
Continuation-in-part of application Ser. No. 231,912, Oct. 22, 1962. This application Dec. 21, 1964, Ser. No. 421,750
Int. Cl. H03k *13/20*
U.S. Cl. 340—347                                 31 Claims

ABSTRACT OF THE DISCLOSURE

The invention relates to an apparatus for producing a digital signal which is a function of the magnitude of a quantity to be measured, whereby energy is stored in a resonant circuit during a first time interval and released as sinusoidal oscillations which can be counted during a second time interval. A characteristic such as the time duration of the second interval or the resonant frequency of the resonant circuit varies with the measurable quantity so that the number of oscillations counted is a function of the measurable quantity.

---

Figures 1, 2:
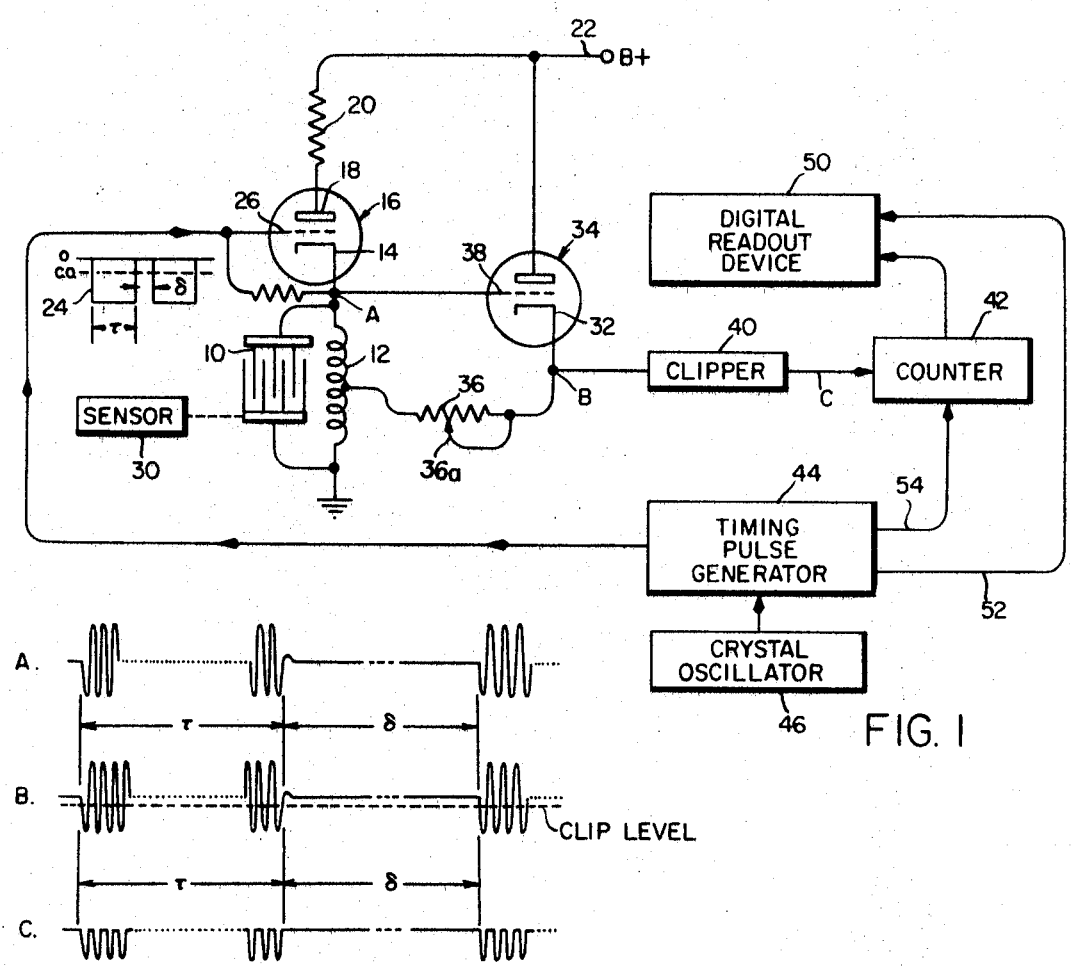

This application is a continuation-in-part of my application Ser. No. 231,912, filed Oct. 22, 1962, which is now abandoned.

This invention relates generally to electronic encoding devices utilizing transducers of the resonant circuit type for directly providing digitally-indicated values of variable quantities such as measured physical variables, and more specifically it relates to a novel digital sensor whereby the measured variable is manifested by the variable operating duration, in one case, or frequency, in another case, of a ringing oscillator or pulsed oscillator which is gated by a pulse of variable or precisely determined duration, respectively, and whereby the output indication is manifested by the count of the oscillation cycles occurring in response to such pulses.

Where the output of a measuring instrument is to provide a telemetric indication, or to be utilized in digital data processing apparatus, it is highly desirable that the indication be rendered in digital format. Perhaps because traditionally most measuring instruments have yielded an analog or time-continuous output, the most common procedure for effecting this result has been to utilize an analog-to-digital converter as an interconnecting link between the analog instrument and the digital data utilization device. However, this results in a system which is complicated, expensive, bulky, and heavy. More seriously, it results in translation errors which arise from dealing with current or voltage amplitudes in the several signal processing stages, and where data from a number of sensors is multiplexed into a digital computer or other data processing device, the analog-to-digital converter frequently becomes a "bottleneck" to the flow of information.

A less commonly used procedure employs a sensing technique which has been fairly well developed for use particularly in telemetric instruments of the radiosonde variety, wherein the physical variable of interest is caused to vary the frequency of an electronic or electromechanical oscillator. Thereupon a measurement of the oscillator frequency provides the indication of the value of the measured variable. When the frequency measurement is made by actually counting the oscillation cycles occurring in an accurately measured time interval, it is apparent that a digital indication is directly obtained, and that any need for the analog-to-digital converter per se is eliminated. Moreover, whereas in electrical analog signal processing an accuray of less than one part in a hundred is the rule and one or two parts in a thousand can be achieved only with considerable difficulty, in an electronic pulse counting operation an accuracy of one part in a million is commonplace. A device for providing a direct digital indication in accordance with this technique is described in my previous application Ser. No. 56,849, filed Sept. 19, 1960, now Pat. No. 3,158,028.

In these prior art devices, the digital sensor comprises a continuous-wave, variable frequency oscillator. The output wave train from the oscillator may be modified by a pulse forming circuit which generates a shaped, unidirectional pulse on each cycle of the oscillator. The train of pulses from the pulse former may then be applied to a gating circuit which usually takes the form of a multigrid gating tube or the combination of a superposition amplifier stage and clipper circuit. The gate is "opened" during each sampling interval, for an accurately predetermined period of time, to allow the formed pulses to be registered by the counter only during such a time period.

There are, however, practical difficulties associated with these prior art devices. For example, since the signal from the digital sensor is frequency or phase-modulated by the value of an unknown variable, the leading and trailing edges of the gate pulse may appear in any phase relation to the oscillator cycles. Hence there is an uncertainty in the first and the last pulses gated into the counter. Another difficulty arises in that it is usually necessary to amplify the successive "bunches" of pulses appearing at the output of the gating circuit in order to impart thereto sufficient amplitude and proper shape to operate the counter in an unambiguous manner. These bunches constitute a wave train which cannot be represented as a periodic function. Accordingly the amplifier has ultrastringent requirements to provide simultaneously the necessary wide bandwidth and omni-frequency stability.

In accordance with this invention, these and other limitations of the prior art arrangements are overcome by providing a digital sensor comprising a ringing oscillator or pulsed oscillator whose operating duration or frequency is made variable in accordance with the value of a measured quantity. This oscillator is not a continuous-wave device, but is gated on and off by the gating pulses. The ringing oscillator in one form thereof is characterized by a resonant L–C circuit including an inductive coil which carries a direct current when the oscillator is turned off, thus storing energy in the magnetic field surrounding the coil. The direct current is turned off instantaneously by a switch tube in response to the leading edge of the gate pulse, whereupon the energy stored in the magnetic field is released as a burst of oscillations in the L–C circuit. This circuit performs in a manner much different from, say, a feedback amplifier operating as an oscillator, in that there is no gradual build-up of the oscillations. On the contrary, the initial oscillation cycles are strong, well-formed and equally spaced. Moreover, the individual oscillator pulses have sufficient amplitude to directly operate an electronic counter without amplification. Furthermore, when the switch tube is again turned on in response to the trailing edge of the gate pulse, the oscillations are rapidly damped to zero amplitude within two or three cycles, so that with proper design of the switch tube, gating circuit and an associated clipper circuit, there should be an uncertainty of not more than the one last pulse gated into the counter.

As is well known, the ringing oscillator per se produces a train of damped oscillations whose amplitude decays with a relaxation time of $Q/\pi$ cycles, where Q is the figure of merit for the resonant circuit. Hence for realizable values of Q, which necessarily takes into account the loading impedance of the output circuit, e.g., the counter, the ringing oscillator may not maintain a usable amplitude for a sufficient number of cycles to achieve the necessary counting precision. In this case the addition of a simple positive feedback circuit is used to convert the basic ringing oscillator into a pulsed oscillator, producing oscillations of relatively constant amplitude at least during the short period of the sampling interval.

It is the object of this invention to provide an improved sensing device for measuring variable quantities such as physical variables and for providing directly a digital output indication.

It is anoher object to provide a frequency modulating transducer and counting converter of novel design, whereby uncertainties in the counting conversion are reduced.

It is a further object to provide for a variable quantity a digital transducer which includes a ringing circuit providing output oscillation groups that vary in duration but not in the frequency of oscillations, or vice versa, in accordance with variations in the quantity.

It is also an object to provide such a digital transducer having an inherent simplicity, whereby accuracy and reliability may be achieved with a minimum of electronic components having non-critical design parameters.

Figure 3:
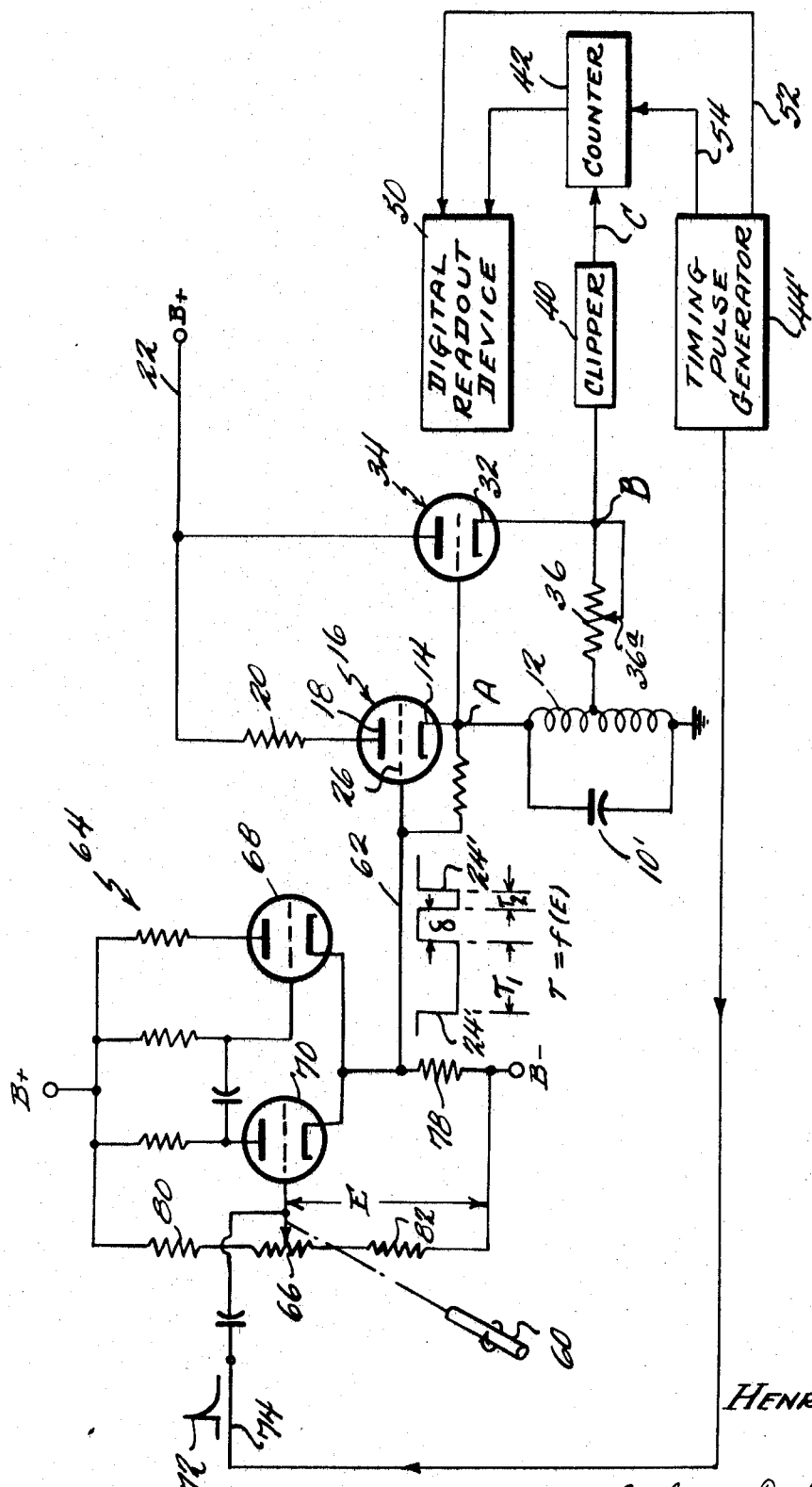

Further objects and advantages will become apparent in the following detailed description, taken in conjunction with the appended drawing, in which:

FIG. 1 of the drawing is an illustration, partially schematic and partially a circuit diagram, of a variable frequency embodiment of apparatus constructed in accordance with this invention, FIG. 2 illustrates typical waveforms appearing at points A, B and C in the circuit of FIGS. 1 and 3, and FIG. 3 illustrates a variable duration constant frequency embodiment of this invention.

In FIG. 1 there is shown a parallel resonant circuit comprising a capacitor 10 and an inductance 12 connected between the cathode 14 of a switch tube 16 and ground. The plate 18 of tube 16 is connected through a current limiting resistor 20 to the usual B+ lead 22.

The above-described circuit per se constitutes a ringing oscillator adapted to be controlled by a voltage waveform as depicted at 24 applied to the control grid 26 of switch tube 16. Assume the condition wherein the grid 26 of tube 16 is held at zero potential and a steady D.C. current, limited by resistor 20, is flowing through the tube and the inductance 12, whereby energy is stored in the magnetic field surrounding the coil thereof. If now the grid 26 is driven well below the cut-off level c.o. by the control waveform 24, this energy appears as oscillations (FIG. 2A) in the resonant circuit 10, 12. Provided that the waveform 24 has an amplitude greater than the sum of the cutoff voltage plus the maximum amplitude of the oscillations, so as to keep the switch tube non-conductive, these oscillations will persist for a considerable length of time, since the original energy is dissipated only in the resistance of the resonant circuit.

At 30 there is shown generally a sensing device adapted in some manner to modify or vary the capacitance of capacitor 10. A great variety of such devices, well known in the art, are adapted to produce a capacitance variation in accordance with force, acceleration, displacement, temperature, pressure, humidity, thickness, rate of flow or other variable. It may be so arranged that the physical variable produces either rotary or translational motion of one plate or set of plates of capacitor 10 with respect to the other, and such motion may vary either the spacing of the capacitor plates or the active area thereof as in an ordinary radio tuning capacitor. The capacitance change may also be effected by a variation in the amount or kind of dielectric material between the plates, as in a fill level gauge for storage tanks and the like where the capacitance is a function of the depth to which the plates are immersed in a dielectric fluid, or the dielectric constant of the material may be varied either by a change in its chemical composition or its electrical characteristics.

In this manner the frequency of oscillations produced by the ringing oscillator becomes a function of the value of the measured variable, and if the oscillation cycles are counted for an exactly measured period of time in accordance with a well known frequency measurement procedure, a digital indication is directly obtained.

Because of the losses in the L–C circuit 10, 12 and the simple ringing oscillator so far described produces a damped sinusoidal waveform. Because of the damping, if the oscillator output is used to directly actuate the counter, the triggering voltage level for the counter may not bear a sufficiently constant phase relation to this waveform, or the amplitude may not remain above the triggering voltage level, for a sufficient number of counting cycles to obtain the required counting precision.

Accordingly there is illustrated a simple feedback circuit for replacing the energy dissipated in the ringing circuit. To this end a cathode follower stage is used to convert the ringing circuit to a Hartley oscillator configuration wherein the cathode 32 of the cathode follower tube 34 is connected through a variable feedback resistor 36 to a center tap on the coil 12 and the grid 38 is connected to the ungrounded end thereof. The resistor 36 may have a nominal value of $Q\omega L/4$ where Q is the figure of merit for the L–C circuit and $\omega$ is a selected center frequency about which the oscillator frequency will vary with the expected changes in the measured quantity. The resistance 36 is then reduced by means of the shorting tap 36a, to compensate for the practically imperfect coupling between the two halves of the coil 12 and the fact that the cathode follower has less than unity gain, until the oscillations have a constant amplitude at the frequency $\omega$.

The cathode follower further provides at point B a low impedance output of oscillations (FIG. 2B), which may be converted by a clipper circuit 40 to a series of unidirectional pulses (FIG. 2C) adapted to trigger an electronic counter 42.

The timing functions for the encoder are performed by a timing pulse generator 44, of generally conventional design, which is paced by a crystal-controlled clock oscillator 46. Box 44 may thus contain, for example, one or more frequency dividers, e.g., counters, for turning on and off a suitable bistable switch multivibrator adapted to generate the rectangular waveform 24. It is important at least that the sampling interval $\tau$ be determined exactly with reference to a predetermined number of cycles of oscillator 46. Such precision is not so essential in the length of the delay period $\delta$ between sampling intervals. This delay period, which must be maintained for a sufficient length of time to permit the D.C. current through coil 12 to build up to its maximum value, is utilized to accomplish the readout and reset functions for counter 42. Typically the digital readout device 50 connected to the counter comprises a Gray code converter and shift register. For a description of one form of Gray code converter, see Richards, Arithemetic Operations in Digital Computers, Van Nostrand, Princeton, N.J., (1955), page 312. In this case the timing pulse generator 44 is adapted during delay period $\delta$ to provide shift pulses on line 52 at the frequency of oscillator 46, which determines the rate at which serial code bits appear at the output (not shown) of readout device 50. Thereupon a reset pulse is delivered to line 54 by the timing pulse generator, for resetting the counter 42. At this time the apparatus is ready for recycling when the next sampling pulse 24 is generated.

While in the embodiment shown and described in FIG. 1, the sensor 30 is arranged to vary the capacitance 10 in the tank circuit to vary the oscillator frequency, it is apparent that the inductance L may be varied instead. In this case if one employs a feedback oscillator as described, the inductance in both halves of the center-tapped coil should be made to vary equally and simultaneously by a scheme similar to that disclosed in Pat. No. 2,715,-680 so that the necessary conditions for oscillation are maintained. It is apparent that in such a device operative at radio frequencies the capacitor in the L-C circuit may be constituted by the stray capacitance existent between turns of the coil and the grid capacitance of the oscillator tube.

A constant frequency, variable duration oscillation bursts type of embodiment of this invention is illustrated in FIG. 3, wherein counter 42 and digital readout device 50 provide a digital indication of the angular position of shaft 60. This embodiment is therefore an illustration of a shaft position encoder. However, as will become apparent, any variable quantity represented by the magnitude of voltage E, regardless of how derived, may be encoded into digital form by this embodiment, as well as by the embodiment of FIG. 1.

In the FIG. 3 embodiments, elements which are the same as those of FIG. 1 are identified by the same number, whereas those slightly different have an added prime mark, and additional elements have different numbers.

The capacitor 10' in FIG. 3 is not variable as it is in FIG. 1, so accordingly the pulsed oscillator output to clipper 40 is of the same freqeuncy each time the normally on switch tube 16 is closed or gated off by the timing or gating pulses 24', which are delivered thereto via line 62. It will be noted that the first pulse 24' in FIG. 3 has a greater duration than the second such pulse. Accordingly the length of time that switch tube 16 is turned off by the first one of these pulses 24', is greater than the length of time that the second pulse gates off tube 16. As a sequence, the number of cycles of oscillation received by clipper 40 is different during these two gating signals, the number received during the first gating signal interval being considerably greater than the number received during the second gating signal interval. The number of counts registered by counter 42 is correspondingly different for the two gating signals, and as will become apparent below, the respective counts are a digital representation of different voltages E, and in the illustrated embodiment, of different angular positions of shaft 60.

The translation of angular position of shaft 60 into a pulse length of corresponding duration may be accomplished by any conventional amplitude-to-pulse length or signal duration function generator, such as the variable delay monostable multivibrator type converter 64. The output pulses 24' on line 62 are a linear function of the DC bias voltage E, which in turn is a function of the angular position of shaft 60, since that shaft is mechanically connected to the arm of a potentiometer 66. Operation of the converter circuit 64 is fully described beginning at page 187 of the book Pulse and Digital Circuits by Millman and Taub, McGraw-Hill Book Company, 1956. Briefly, tube 68 is normally conducting and tube 70 is cut off. However, when a positive triggering pulse 72 on line 74 is applied to the grid of tube 70, to cause a transition from a normal stable state to a quasi-stable state, the current in tube 68 becomes zero, and a current flows through tube 70. This causes an abrupt negative going change in the voltage across the cathode resistor 78, giving rise to a pulse 24'. As previously indicated, the duration of such pulses is then a linear function of the applied bias voltage E on tube 70.

Of course, the variable voltage E, which is to be measured, may come from any source other than being derived by variation in the setting up of potentiometer 66. If the variable voltage source E is derived externally, as from other equipment, then potentiometer 66 and the potential dividing resistors 80 and 82 are eliminated, though the external voltage E is still applied between the grid of tube 70 and ground.

As above indicated, each time pulse 72 is applied to trigger converter 64, a new output pulse 24' is generated and this pulse in turn gates the oscillator on for its duration so that the constant frequency output oscillations therefrom may be counted. Successive pulses 72 are derived from a timing pulse generator 44', which also applies reset pulses to counter 42 over line 54 during the delay period δ between successive gating signals 24', the same as previously described relative to FIG. 1. Shift pulses on line 52 are also employed in the same manner as previously described.

In general, the operation of the circuitry in FIG. 3 is the same as that described for FIG. 1 except for the differences already noted.

From the foregoing description it is apparent that the timing pulse generator 44 and crystal oscillator 46 of FIG. 1, and the timing pulse generator 44' and converter 64 of FIG. 3 form a circuit which causes first and second signal intervals respectively designated δ and τ, which in turn respectively gate switching tube 16 on so that direct current on line 22 stores energy in coil 12 of the resonant circuit LC and then off for the duration τ to cause the resonant circuit to be a ringing circuit which provides a burst of oscillations to clipper 40. In the FIG. 1 embodiment, the oscillation burst is of the same duration every time, but the number of oscillations therein, i.e., frequency, is a function of a characteristic of the resonant circuit, for example its capacitance. On the other hand, in the FIG. 3 embodiment, the frequency of the resonant circuit is constant for each successive oscillation burst, but the duration of those bursts is a function of the magnitude of voltage E and whatever other physical or like variable quantity that causes variation in voltage E.

It is therefore apparent that this invention has provided for all of the objects and advantages herein mentioned. Still other objects and advantages of the invention, and even further modifications thereof, will become apparent to those of ordinary skill in the art after reading this disclosure. While the invention has been shown and described in connection with only two embodiments, and only a few variations have been specifically suggested, such showing and description are meant to be illustrative only and not restrictive, since obviously many other changes and modifications can be made within the scope of the invention as is set forth in the appended claims.

What is claimed is:

1. In apparatus for sensing the magnitude of a quantity and producing a digital signal which is a function of said quantity,
   a resonant circuit,
   a timing circuit for providing first and second signal intervals,
   means controlled by said timing circuit for storing energy in said resonant circuit during a said first time interval and for releasing said energy as oscillations in said resonant circuit during a said second timing interval,
   means for modifying a characteristic of one of said circuits in accordance with the value of a variable quantity to be measured to vary accordingly the number of oscillations during said second interval, and
   means for counting the cycles of said oscillations during said second timing interval to provide a digital indication of said value of said variable quantity.

2. Apparatus as in claim 1 wherein the said modifying means comprises means for modifying the resonant frequency of said resonant circuit.

3. Apparatus as in claim 2 wherein said resonant circuit includes a capacitive element and an inductive element and the said frequency of the resonant circuit is modified by the modifying means changing the reactance of one of said elements.

4. Apparatus as in claim 1 wherein said modifying means comprises means for modifying the time duration of said second interval.

5. Apparatus as in claim 4 wherein said modifying means includes means for converting different values of the said variable quantity into different durations of said second signal interval.

6. Apparatus as in claim 5 wherein said variable quantity is manifested as a variable amplitude voltage and said converting means is an amplitude to pulse length converter.

7. In apparatus for sensing the magnitude of a quantity and producing a digital signal which is a function of said quantity,
   a resonant circuit,
   a timing circuit for providing first and second signal intervals,
   means controlled by said timing circuit for storing energy in said resonant circuit during a said first time interval and for releasing said energy as oscillations in said resonant circuit during a said second timing interval,
   feedback circuit means for maintaining a substantially constant amplitude of said oscillations during said second interval,
   means for modifying a characteristic of one of said circuits in accordance with the value of a variable quantity to be measured to vary accordingly the number of oscillations during said second interval, and
   means for counting the cycles of said oscillations during said second timing interval to provide a digital indication of said value of said variable quantity.

8. Apparatus as in claim 7 wherein said characteristic modifying means comprises means for modifying the operating frequency of said resonant circuit.

9. Apparatus as in claim 7 wherein said characteristic modifying means comprises means for modifying the duration of said second interval.

10. In apparatus for sensing the magnitude of a quantity and producing a digital signal which is a function of said quantity,
    a resonant circuit including a capacitive element and an inductive element,
    a timing circuit for providing first and second signal intervals,
    a source of direct current,
    circuit means controlled by said timing circuit for passing said current through said inductive element for a said first time interval wherein energy is stored in the magnetic field of said inductive element and for effectively disconnecting said circuit means from said resonant circuit for a said second timing interval during which said energy appears as oscillations in said resonant circuit.
    means for modifying a characteristic of one of said circuits in accordance with the value of a variable quantity to be measured to vary accordingly the number of oscillations during said second interval, and.
    means for counting the cycles of said oscillations during said second timing interval to provide a digital indication of said value of said variable quantity.

11. In apparatus for sensing the magnitude of a quantity and producing a digital signal which is a function of said quantity,
    a resonant circuit including a capacitive element and an inductive element,
    a timing circuit for providing first and second signal intervals,
    a source of direct current,
    circuit means controlled by said timing means for passing said current through said inductive element for a said first time interval wherein energy is stored in the magnetic field of said inductive element and for effectively disconnecting said circuit means from said resonant circuit for a said second timing interval during which said energy appears as oscillations in said resonant circuit,
    feedback circuit means for maintaining a substantially constant amplitude of said oscillations during said second interval,
    means for modifying a characteristic of one of said elements in accordance with the value of a variable quantity to be measured to vary accordingly the number of oscillations during said second interval, and
    means for counting the cycles of said oscillations during said second timing interval to provide a digital indication of said value of said variable quantity.

12. In apparatus for sensing the magnitude of a physical quantity and producing a digital signal which is a function of said quantity,
    a resonant circuit including a capacitive element and an inductive element,
    a crystal oscillator,
    a timing pulse generator controlled by said crystal oscillator,
    means controlled by said timing pulse generator for storing energy in one of said resonant circuit elements during a first time interval and for releasing said energy as oscillations in said resonant circuit during a second timing interval related to a fixed number of cycles of said crystal oscillator,
    means for modifying the reactance of one of said elements in accordance with the value of a variable quantity to be measured to vary accordingly the number of said resonant circuit oscillations during said second interval, and
    means for counting the cycles of said resonant circuit oscillations during said second timing interval to provide a digital indication of said value of said variable quantity.

13. In apparatus for sensing the magnitude of a physical quantity and producing a digital signal which is a function of said quantity,
    a resonant circuit including a capacitive element and an inductive element,
    a crystal oscillator,
    a timing pulse generator controlled by said crystal oscillator,
    a source of direct current,
    circuit means controlled by said timing pulse generator for passing said current through said inductive element for a first time interval wherein energy is stored in the magnetic field of said inductive element and for effectively disconnecting said latter circuit from said resonant circuit for a second timing interval related to a fixed number of cycles of said crystal oscillator during which interval said energy appears as oscillations in said resonant circuit,
    means for modifying the reactance of one of said elements in accordance with the value of a variable quantity to be measured to vary accordingly the number of said resonant circuit oscillations during said second interval, and
    means for counting the cycles of said resonant circuit oscillations during said second timing interval to provide a digital indication of said value of said variable quantity.

14. In apparatus for sensing the magnitude of a variable physical quantity and producing a digital signal which is a function of said quantity, the improvement comprising:
    a resonant circuit tuned to a predetermined frequency,
    means including a function generator for producing spaced signals having a duration which is a function of the said quantity,
    means controlled by said function generator for storing energy in said resonant circuit during the time intervals between said signals and for releasing said stored energy in said resonant circuit as bursts of oscillations of said frequency, said oscillation bursts having respective durations related to the duration of said signals, respectively, and
means for counting the cycles of said resonant circuit oscillations during each burst thereof to provide a digital indication of the instant value of said variable quantity.

15. Apparatus as in claim 14 and further including feedback circuit means for maintaining a substantially constant amplitude of said oscillations during each said burst.

16. Apparatus as in claim 15 wherein said resonant circuit, feedback circuit means and said controlled means comprise a Hartley type oscillator.

17. Apparatus as in claim 15 wherein said controlled means includes a normally closed switch which opens in response to each said signal for the duration thereof.

18. In an encoder for translating the magnitude of a variable quantity into a digital signal which is a function of that quantity, the improvement comprising:
oscillation generating means including a gated ringing oscillator for providing bursts of oscillations,
means for generating gating signals for causing said oscillation generating means to provide oscillation bursts only for the duration of each gating signal,
means for varying the operation of one of said generating means in accordance with the value of said variable quantity to vary accordingly the number of oscillations occurring from said oscillation generating means during each oscillation burst; and
means for counting said number of oscillations during each burst to provide a digital indication of the instant value of said variable quantity.

19. Apparatus as in claim 18 wherein said modifying means comprises means for varying the frequency of said oscillations from the ringing oscillator during a gating signal, and said gating signal generating means comprises means causing said spaced gating signals to be of equal duration.

20. Apparatus as in claim 18 wherein said modifying means comprises means for varying the duration of said gating signals and wherein the frequency of operation of said ringing oscillator during said gating signals is constant.

21. Apparatus as in claim 18 wherein said oscillation generation means includes a positive feedback circuit coupled to said ringing oscillator and forming therewith a pulsed oscillator for maintaining a substantially constant amplitude of said oscillations throughout each burst thereof.

22. Apparatus for producing a digital output signal which is a function of an input quantity comprising:
a resonant circuit for producing sinusoidal oscillations,
means responsive to said input quantity for imparting to said oscillations an attribute which is a function of said input quantity,
electrical means attached to said resonant circuit for storing energy in said resonant circuit during a time interval and releasing said energy to cause said oscillations after the end of said time interval,
a timing circuit connected to said electrical means for producing said time interval, and
counting means attached to said resonant circuit for counting oscillations produced thereby to provide said digital output signal.

23. Apparatus as in claim 22 wherein said resonant circuit includes a capacitor and inductor connected in parallel.

24. Apparatus for continuously sensing the magnitude of an input quantity and producing a digital signal at separated times which is a function of said quantity comprising:
a resonant circuit,
a timing circuit for providing a first and second timing interval,
means controlled by said timing circuit for storing energy in said resonant circuit during said first timing interval and for releasing said energy during said second timing interval,
means for modifying a characteristic of one of said circuits as a function of said input quantity to vary the number of oscillations produced during said second interval,
counting means for counting the cycles of said oscillations during said second timing interval to provide a digital signal which indicates the magnitude of said input quantity during said first timing interval, and
means associated with said timing circuit for causing said timing circuit to produce another first and second timing interval after the end of each said second timing interval so that said counting means produces a digital signal at given time separated intervals which indicates the magnitude of said input quantity during the last said first timing interval.

25. Apparatus as in claim 24 wherein said modifying means comprises means for modifying the resonant frequency of said resonant circuit.

26. Apparatus as in claim 25 wherein said resonant circuit includes a capacitive element and an inductive element and the said frequency of the resonant circuit is modified by the modifying means by changing the reactance of one of said elements.

27. Apparatus as in claim 24 wherein said modifying means comprises means for modifying the time duration of said second time interval.

28. Apparatus as in claim 27 wherein said modifying means includes means for converting different values of the said input quantity into different durations of said second time interval.

29. Apparatus as in claim 28 wherein said input quantity is manifested by a variable amplitude voltage and said converting means is an amplitude to pulse length converter.

30. Apparatus as in claim 24 including means to reset said counting means to a count of zero during each said first timing interval.

31. Apparatus for sensing the magnitude of a quantity and producing a digital signal which is a function of said quantity comprising:
an oscillator circuit for producing sinusoidal signals,
a timing circuit connected to said oscillator for producing an electrical signal having a given time duration for causing said oscillator to produce only during said given time duration,
means for modifying a characteristic of one of said circuits in accordance with the value of said quantity to be measured so that the number of oscillations produced during said given time duration is a function of said quantity and
means for counting the cycles of oscillation during said given time duration.

References Cited
UNITED STATES PATENTS

| | | | |
|---|---|---|---|
| 2,393,717 | 1/1946 | Speaker | 324—34 |
| 2,422,742 | 6/1947 | Odessey | 324—34 |
| 2,442,805 | 6/1948 | Gilson | 324—34 |
| 3,206,741 | 9/1965 | Kreyer | 340—347 |
| 3,263,066 | 7/1966 | Seegmiller | 340—347 |
| 3,349,391 | 10/1967 | Kimura | 340—347 |
| 2,929,055 | 3/1960 | Wahlstrom | 340—347 |
| 3,028,550 | 4/1962 | Naydan et al. | 340—347 X |

OTHER REFERENCES

Chance et al., Radiation Laboratory Series, vol. 19 ("Waveforms"), 1949 (pp. 142–143 relied on).

MAYNARD R. WILBUR, Primary Examiner

G. R. EDWARDS, Assistant Examiner